United States Patent
Guha et al.

(10) Patent No.: US 9,924,045 B1
(45) Date of Patent: Mar. 20, 2018

(54) IDENTIFYING UNUSED CAPACITY IN WIRELESS NETWORKS

(71) Applicant: Verizon Patent and Licensing Inc., Arlington, VA (US)

(72) Inventors: Ratul K. Guha, Kendall Park, NJ (US); Scott A. Townley, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/245,910

(22) Filed: Aug. 24, 2016

(51) Int. Cl.
| | |
|---|---|
| H04M 15/00 | (2006.01) |
| H04L 12/24 | (2006.01) |
| H04L 12/26 | (2006.01) |
| H04W 24/08 | (2009.01) |
| H04L 29/08 | (2006.01) |

(52) U.S. Cl.
CPC ........ *H04M 15/8027* (2013.01); *H04L 41/12* (2013.01); *H04L 41/147* (2013.01); *H04L 43/0882* (2013.01); *H04L 67/306* (2013.01); *H04M 15/58* (2013.01); *H04M 15/8083* (2013.01); *H04W 24/08* (2013.01)

(58) Field of Classification Search
CPC ............. H04M 15/8027; H04M 15/58; H04M 15/8083; H04L 41/12; H04L 41/147; H04L 43/0882; H04L 67/306; H04W 24/08
See application file for complete search history.

(56) References Cited

U.S. PATENT DOCUMENTS

| | | | |
|---|---|---|---|
| 6,996,374 B1* | 2/2006 | Bao ................... | H04W 24/02 455/423 |
| 8,457,010 B2* | 6/2013 | Lientz ................ | H04L 67/2814 370/252 |
| 8,891,486 B1* | 11/2014 | Vivanco ............. | H04W 4/00 370/331 |
| 2003/0231586 A1* | 12/2003 | Chheda .............. | H04W 28/18 370/230 |
| 2012/0215911 A1* | 8/2012 | Raleigh .............. | H04L 12/14 709/224 |
| 2014/0043970 A1* | 2/2014 | Lientz ................ | H04L 41/0896 370/230 |

* cited by examiner

*Primary Examiner* — Kashif Siddiqui

(57) ABSTRACT

A method may include determining a capacity metric for sectors in a network, estimating a usage metric for each of the sectors for periods of time and determining a number of user devices that can access data services based on the capacity metric and the usage metric. The method may also include storing information identifying the determined number of user devices, receiving a request from a first user device for access to data services during a first period of time and accessing the stored information to determine whether the number of user devices that can access data services for the first period of time is greater than zero. The method may further include providing access via the wireless network to the first user device during the first period of time, in response to determining that the number of user devices that can access data services is greater than zero.

20 Claims, 10 Drawing Sheets

| ENODE B | SECTOR | CARRIER | 1:00-1:15 | 1:15-1:30 | 1:30-1:45 | 1:45-2:00 | 2:00-2:15 | 2:15-2:30 |
|---------|--------|---------|-----------|-----------|-----------|-----------|-----------|-----------|
| 210001 | 1 | 1 | 1 | 3 | 5 | 5 | 0 | 0 |
| 210001 | 2 | 1 | 0 | 1 | 4 | 3 | 4 | 2 |
| 210001 | 3 | 1 | 5 | 4 | 4 | 3 | 5 | 5 |
| 210002 | 1 | 1 | 4 | 5 | 4 | 5 | 5 | 2 |
| 210002 | 1 | 2 | 1 | 1 | 0 | 5 | 5 | 3 |
| 210002 | 2 | 1 | 0 | 2 | 3 | 0 | 4 | 4 |
| 210004 | 1 | 1 | 0 | 2 | 2 | 1 | 2 | 4 |
| 210004 | 2 | 1 | 0 | 1 | 3 | 5 | 0 | 4 |
| 210004 | 3 | 1 | 3 | 4 | 5 | 1 | 4 | 4 |
| 210055 | 1 | 1 | 3 | 0 | 2 | 2 | 3 | 5 |
| 210055 | 2 | 1 | 4 | 5 | 0 | 4 | 2 | 4 |
| 210055 | 3 | 1 | 2 | 1 | 2 | 4 | 4 | 2 |
| 210056 | 1 | 1 | 5 | 2 | 3 | 2 | 0 | 0 |

FIG. 7

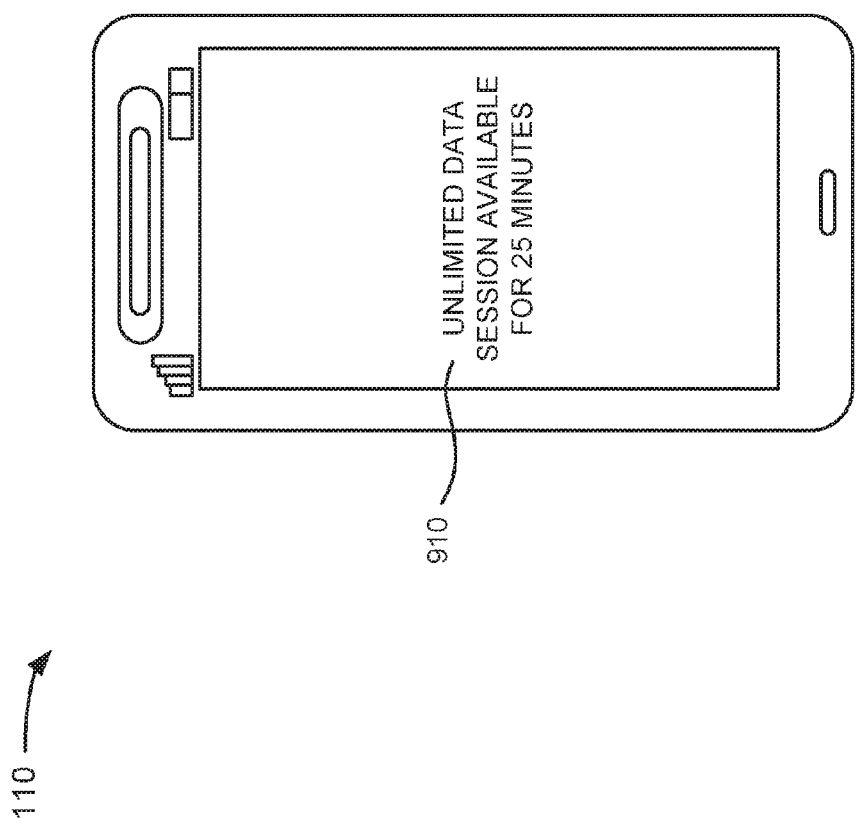

IDENTIFYING UNUSED CAPACITY IN WIRELESS NETWORKS

BACKGROUND INFORMATION

Wireless broadband network service providers typically provide a customer with a predetermined amount of data usage over a period of time, such as one month, based on the customer's data plan. If the customer exceeds the predetermined amount of data usage associated with his/her plan, the service provider will charge the customer a fee for the additional amount of data usage above the plan limit, based on parameters established by the customer's particular data plan. Such data service plans typically make a customer cautious in using high bandwidth applications (e.g., data streaming applications) to avoid exceeding his/her data plan limit.

BRIEF DESCRIPTION OF THE DRAWINGS

FIG. 7 illustrates a mapping table generated in accordance with the processing of FIG. 6;

FIGS. 9A and 9B illustrate information displayed by the user device of FIG. 1 in accordance with an exemplary implementation.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to estimating network utilization during various periods of time based on historic and/or expected network usage. In one exemplary implementation, a service provider dynamically estimates future network usage and determines an expected excess network capacity during various future periods of time. The service provider may determine the expected excess network capacity on a per sector, cell or other level. The service provider may then offer slots of time for using the wireless service when excess network capacity is expected to exist. For example, the service provider may offer a certain number of users access to data service during time slots that otherwise would be unused. In some instances, the service provider may offer unlimited data access during the time slots that are available for free as a part of a bundled plan or for a per-slot charge, with the data usage during these time slots not counting against the customer's monthly plan limit.

When customers use the wireless service during time slots that would otherwise be unused, overall network utilization increases as a result of the increase in efficiency of the resource usage. For example, use of cell capacity and network capacity may be increased resulting in optimized cell and network capacity and bandwidth usage. In addition, having a more fully loaded or utilized network allows the service provider to more accurately determine full network capacity under actual conditions. For example, loading the network to full or near full capacity by using otherwise unused time slots may allow the service provider to determine how much data capacity/load the wireless network can actually handle, as opposed to a theoretical maximum load. In addition, monitoring the wireless network under fully or nearly fully loaded conditions may allow the service provider to identify locations where additional network resources are needed to ensure and/or improve network availability and reliability.

Figure 1:
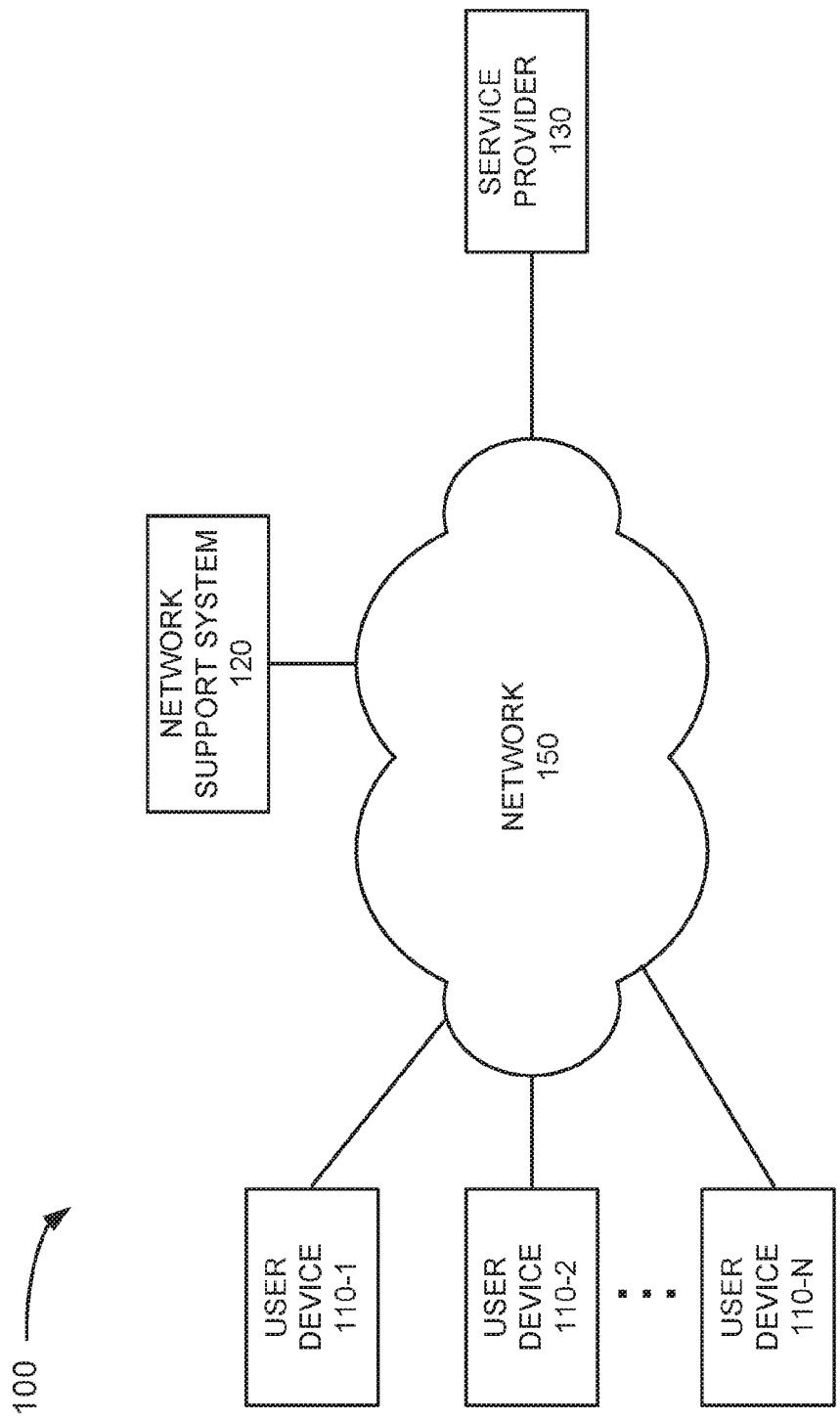
FIG. 1 illustrates an exemplary environment in which systems and methods described herein may be implemented.

FIG. 1 is a block diagram of an exemplary environment 100 in which systems and methods described herein may be implemented. Environment 100 may include user devices 110-1 through 110-N, network support system (NSS) 120, service provider 130 and network 150.

User devices 110-1 through 110-N (individually referred to as user device 110-x or 110 and collectively as user devices 110) may include a mobile device, such as wireless or cellular telephone device (e.g., a conventional cell phone with data processing capabilities), a smart phone, a personal digital assistant (PDA) that can include a radiotelephone, etc. In another implementation, user devices 110 may include any type of mobile computer device or system, such as a personal computer (PC), a laptop, a tablet computer, a notebook, a netbook, a wearable computer (e.g., a wrist watch, eyeglasses, etc.), a game playing device, a music playing device, a home appliance device, a home monitoring device, etc., that may include communication functionality. User devices 110 may connect to network 150 and other devices in environment 100 (e.g., NSS 120, service provider 130, etc.) via any conventional technique, such as wired, wireless, optical connections or a combination of these techniques. User device 110 and the person associated with user device 110 (e.g., the party holding or using user device 110) may be referred to collectively as user device 110 in the description below.

NSS 120 may include one or more computing devices or systems used to estimate utilization of network 150. For example, NSS 120 may communicate with base stations, eNodeBs, gateways, specialized data monitoring devices, etc., to determine loading conditions on network 150. NSS 120 may also access historical data usage associated with network 150 during various times of day to estimate future network load conditions, such as whether excess capacity will be available during various time periods, as described in more detail below.

Service provider 130 may include one or more computer devices and systems associated with providing wireless services via network 150. For example, service provider 130 may store information regarding service plans for a large number of subscribers (also referred to herein as customers) and track data usage for each subscriber over a period of time (e.g., one month). Service provider 130 may communicate with NSS 120 to identify future time periods that may be offered to subscribers for data service, as described in more detail below.

Network 150 may include one or more wired, wireless and/or optical networks that are capable of receiving and transmitting data, voice and/or video signals. For example, network 150 may include one or more public switched telephone networks (PSTNs) or other type of switched network. Network 150 may also include one or more wireless networks and may include a number of transmission towers for receiving wireless signals and forwarding the wireless signals toward the intended destinations. Network 150 may further include one or more satellite networks, one or more packet switched networks, such as an Internet protocol (IP) based network, a local area network (LAN), a wide area network (WAN), a personal area network (PAN), a long term evolution (LTE) network, a WiFi network, a Bluetooth network, an intranet, the Internet, or another type of network that is capable of transmitting data. Network 150 provides wireless packet-switched services and wireless Internet protocol (IP) connectivity to user devices 110 to provide, for example, data, voice, and/or multimedia services.

The exemplary configuration illustrated in FIG. 1 is provided for simplicity. It should be understood that a typical network may include more or fewer devices than illustrated in FIG. 1. For example, environment 100 may include a large number (e.g., thousands or more) of user devices 110 and multiple NSSs 120. In addition, network 150 may include additional elements, such as eNodeBs, base stations, switches, gateways, routers, monitoring devices, etc., that aid in routing data and collecting information regarding network conditions.

In addition, various functions are described below as being performed by particular components in environment 100. In other implementations, various functions described as being performed by one device may be performed by another device or multiple other devices, and/or various functions described as being performed by multiple devices may be combined and performed by a single device.

Figure 2:
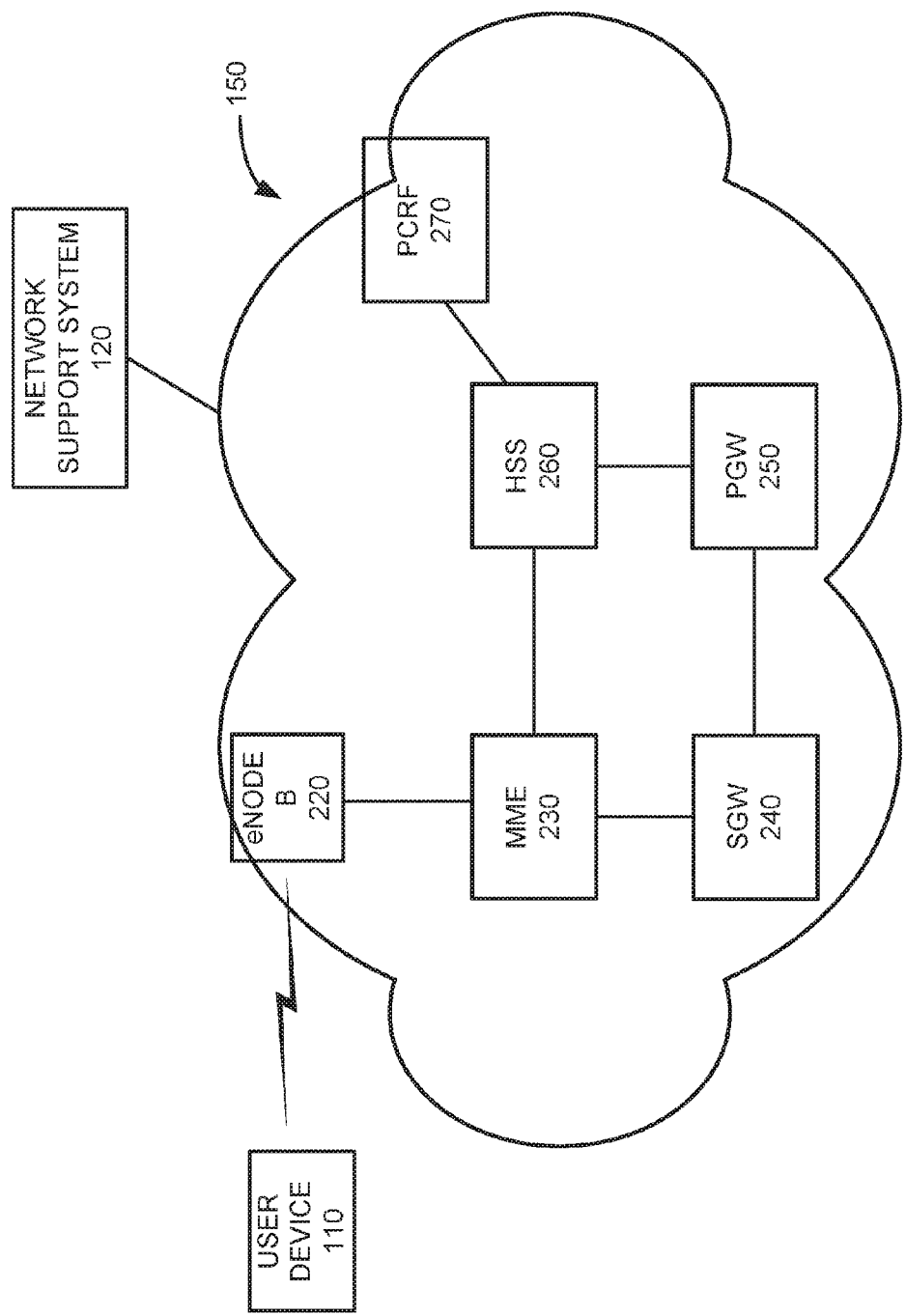
FIG. 2 illustrates an exemplary configuration of components implemented in a portion of the network of FIG. 1.

FIG. 2 is an exemplary block diagram illustrating a portion of network 150. In the implementation depicted in FIG. 2, network 150 is a long term evolution (LTE) network. It should be understood, however, that embodiments described herein may operate in other types of wireless networks, such as networks operating with other networking standards, such Global System for Mobile Communications (GSM), Universal Mobile Telecommunications System (UMTS), IS-2000, etc.

Network 150 may include an evolved packet core (ePC) that includes an evolved Node B (eNodeB) 220, mobile management entity (MME) 230, serving gateway (SGW) 240, packet gateway (PGW) 250, home subscriber server (HSS) 260 and policy and charging rules function (PCRF) 270. EnodeB 220 may be part of an evolved Universal Mobile Telecommunications System (UMTS) Terrestrial Radio Access Network (eUTRAN).

eNodeB 220 may include one or more devices and other components having functionality that allow user devices 110 to wirelessly connect to network 150. eNodeB 220 may be associated with one or more cells/sectors. For example, each cell or sector in network 150 may include one or more radio frequency (RF) transceivers pointed in a particular direction. In one implementation, some of the eNodeBs 220 may be associated with multiple sectors (e.g., 2, 3 or more) of network 150. In such an implementation, an eNodeB 220 may include multiple RF transceivers pointed in different directions to service different geographic areas. The term "sector" as used herein shall be broadly construed as any geographic area associated with an eNodeB, base station or other element of a radio network, and may be used interchangeably with the term "cell." Each sector in network 150 may also be associated with multiple carriers. For example, an eNodeB 220 may include multiple radios that operate at different frequencies or different frequency bands in the same sector.

eNodeB 220 may interface with MME 230. MME 230 may include one or more devices that implement control plane processing for network 150. For example, MME 230 may implement tracking and paging procedures for user devices 110, may activate and deactivate bearers for user devices 110, may authenticate respective users of user devices 110, and may interface with non-LTE radio access networks. A bearer may represent a logical channel with particular quality of service (QoS) requirements, and can be used in some embodiments to control packet flows as described herein. MME 230 may also select a particular SGW 240 for a particular user device 110. MME 230 may interface with other MME devices (not shown) in network 150 and may send and receive information associated with user devices 110, which may allow one MME 230 to take over control plane processing of user devices 110 serviced by another MME 230, if the other MME 230 becomes unavailable.

SGW 240 may provide an access point to and from user devices 110, may handle forwarding of data packets for user devices 110, and may act as a local anchor point during handover procedures between eNodeBs 220. SGW 240 may interface with PGW 250. PGW 250 may function as a gateway to a core network, such as a wide area network (WAN) (not shown) that allows delivery of Internet protocol (IP) services to user devices 110.

HSS 260 may store information associated with user devices 110 and/or information associated with users of user devices 110. For example, HSS 260 may store user profiles that include authentication and access authorization information. Each user/subscription profile may include a list of user devices 110 associated with the subscriptions as well as an indication of which user devices 110 are active (e.g., authorized to connect to network 150).

PCRF 270 may implement policy charging and rule functions, such as providing quality of service (QoS) requirements, bandwidth and/or charges for a particular service for user devices 110. PCRF 270 may determine how a certain service data flow will be treated, and may ensure that user plane traffic mapping and treatment is in accordance with a user's subscription profile.

Although FIG. 2 shows exemplary components of network 150, in other implementations, network 150 may include fewer components, different components, differently arranged components, or additional components than depicted in FIG. 2. For example, network 150 may include a large number of eNodeBs 220, MMEs 230, SGWs 240, PGWs 250 HSSs 260 and PCRFs 270. Additionally, or alternatively, one or more components of network 150 may perform functions described as being performed by one or more other components.

Figure 3:
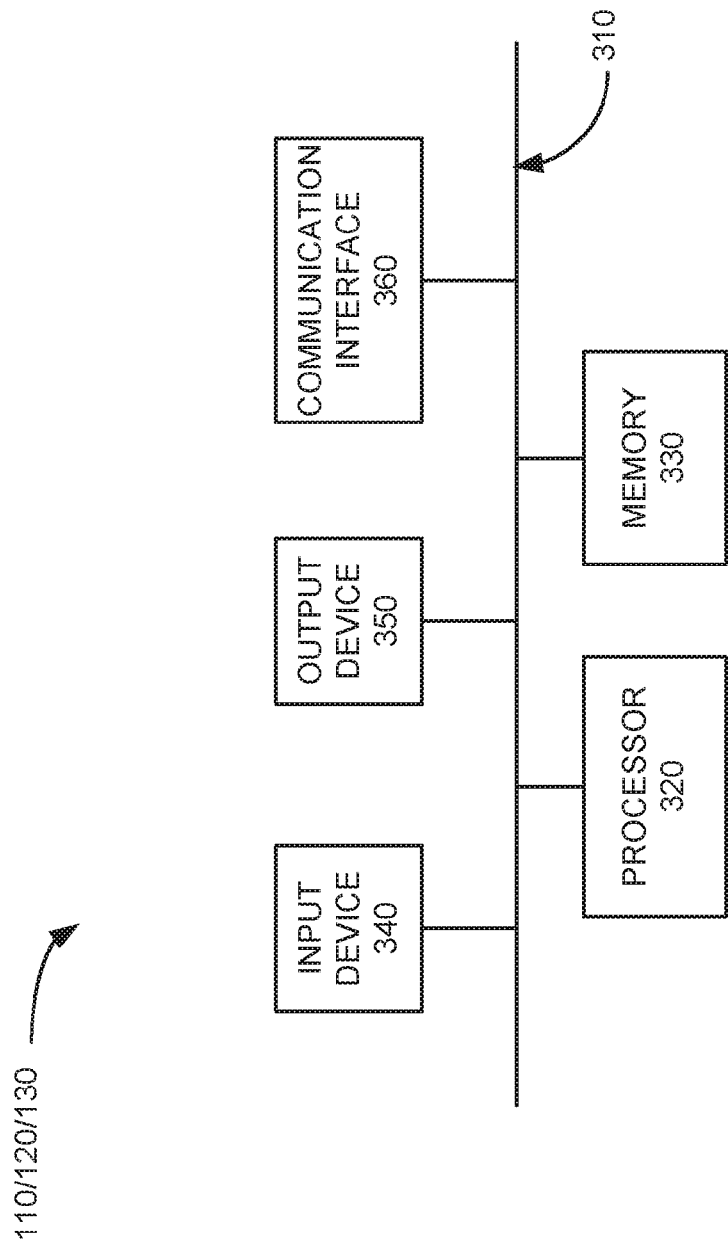
FIG. 3 illustrates an exemplary configuration of logic components included in one or more of the devices of FIG. 1.

FIG. 3 illustrates an exemplary configuration of NSS 120. Other devices in environment 100, such as user device 110 and service provider 130 may be configured in a similar manner. Referring to FIG. 3, NSS 120 may include bus 310, processor 320, memory 330, input device 340, output device 350 and communication interface 360. Bus 310 may include a path that permits communication among the elements of NSS 120.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to NSS 120, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD)), a printer, a speaker, etc. In some implementations, a touch screen display may act as both an input device and an output device.

Communication interface 360 may include one or more transceivers that NSS 120 (or user device 110 or service provider 130) uses to communicate with other devices via wired, wireless or optical mechanisms. For example, communication interface 360 may include one or more radio frequency (RF) transmitters, receivers and/or transceivers and one or more antennas for transmitting and receiving RF data via network 150. Communication interface 360 may also include a modem or an Ethernet interface to a LAN or other mechanisms for communicating with elements in a network, such as network 150 or another network.

The exemplary configuration illustrated in FIG. 3 is provided for simplicity. It should be understood that NSS 120 (or user device 110 or service provider 130) may include more or fewer devices than illustrated in FIG. 3. In an exemplary implementation, NSS 120 (or user device 110 or service provider 130) perform operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
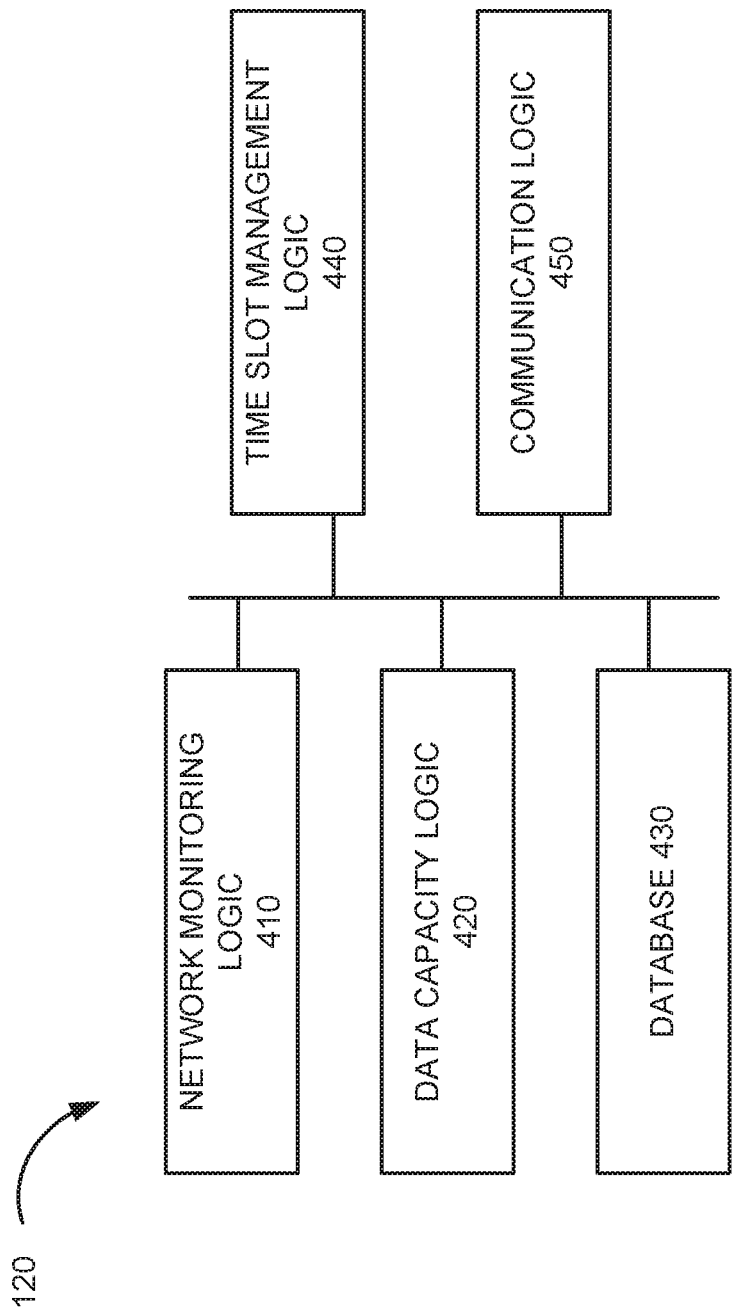
FIG. 4 illustrates an exemplary configuration of logic components implemented by one of the devices of FIG. 1.

FIG. 4 is an exemplary functional block diagram of components implemented in NSS 120. In an exemplary implementation, all or some of the components illustrated in FIG. 4 may be implemented by processor 320 executing software instructions stored in memory 330.

NSS 120 may include network monitoring logic 410, data capacity logic 420, database 430, time slot management logic 440 and communication logic 450. In alternative implementations, these components or a portion of these components may be located externally with respect to NSS 120.

Network monitoring logic 410 may include logic to identify data usage on network 150 during actual loading conditions in real time or near real time. In one implementation, network monitoring logic 410 may communicate with various gateways, eNodeBs and network monitoring devices located throughout network 150 to identify data usage on network 150. In addition, network monitoring logic 410 may identify total data traffic on a per sector basis. For example, network monitoring logic 410 may gather radio performance measurements from each sector site in network 150 over various periods of time. Network monitoring logic 410 may store this information in database 430.

Data capacity logic 420 may include logic to identify the capacity of each sector in network 150. In some instances, the capacity may vary over time. For example, based on addition of new equipment in a particular cell, the capacity may increase. Alternatively, if equipment is being serviced in a particular sector, the network capacity for that cell may decrease. The data capacity for a particular sector may also incorporate various metrics, such as cell bandwidth, spectral efficiency, propagation characteristics, etc. Data capacity logic 420 may store current capacity information in database 430.

Database 430 may includes one or more data storage devices that store one or more databases of information associated with network 150. For example, as described above, network monitoring logic 410 may store data usage information on a per sector level granularity in database 430. In addition, data capacity logic 420 may store data capacity information for network 150 on a per sector level granularity in database 430.

Time slot management logic 440 may include logic to determine the current or expected unused capacity of network 150 on a per sector basis at any given time or over a period of time. For example, time slot management logic 440 may estimate an amount of data capacity in each sector that is expected to be unused for each of a number of different future periods of times (also referred to herein as time slots). Time slot management logic 440 may determine if excess data capacity can and should be provisioned or offered to various customers, as described in more detail below.

Communication logic 450 may include logic to communicate with elements in environment 100 directly or via network 150. For example, communication logic 450 may provide alerts to customers or subscribers associated with service provider 130. For example, communication logic 450 may signal customers that time slots for data usage (e.g., streaming downloads) are available at particular periods of the time, as described in more detail below. Communication logic 450 may also provide information to service provider 130 regarding customers' usage of data.

Although FIG. 4 shows exemplary components of NSS 120, in other implementations, NSS 120 may include fewer components, different components, differently arranged components, or additional components than depicted in FIG. 4. In addition, functions described as being performed by one of the components in FIG. 4 may alternatively be performed by another one or more of the components of NSS 120.

Figure 5:
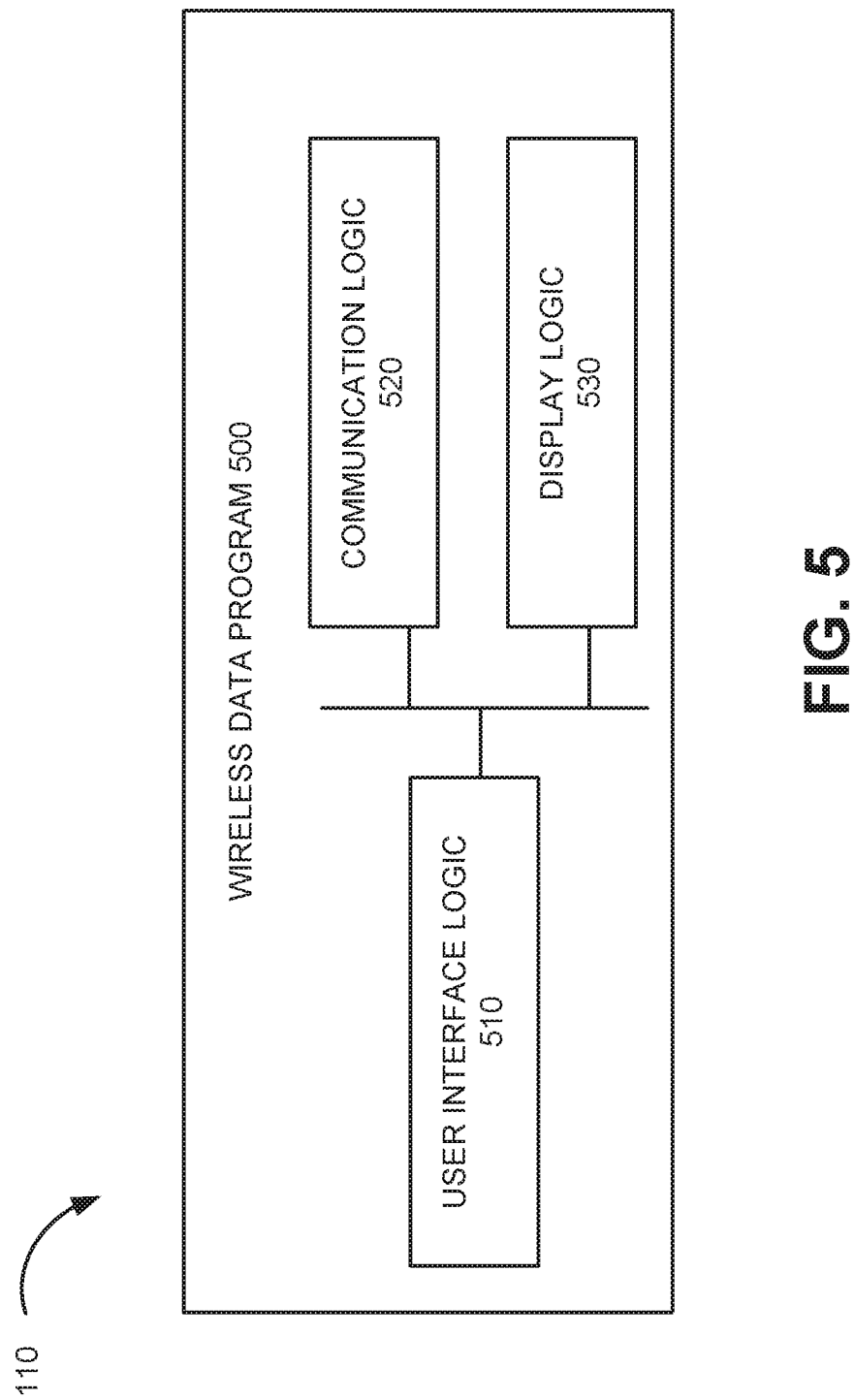
FIG. 5 illustrates an exemplary configuration of logic components implemented in another one of the devices of FIG. 1.

FIG. 5 is an exemplary functional block diagram of components implemented in user device 110 of FIG. 1. Referring to FIG. 5, wireless data program 500 and its various logic components are shown in FIG. 5 as being included in user device 110. For example, wireless data program 500 may be stored in memory 330 of user device 110. In alternative implementations, these components or a portion of these components may be located externally with respect to user device 110.

Wireless data program 500 may be an application program associated with the user's data plan provided by service provider 130. Wireless data program 500 may include software instructions executed by processor 320 that allows a user associated with user device 110 to request data usage during particular periods of time, or receive alerts from NSS 120 and/or service provider 130 indicating that "unlimited" data is available during particular periods of time. In some implementations, service provider 130 may not track or count the additional data usage against the user's data plan limits and may allow for unlimited data usage during particular periods of time, as described in more detail below.

Wireless data program 500 may include user interface logic 510, communication logic 520 and display logic 530. User interface logic 510 may include logic to facilitate requesting or accepting use of data services via network 150. For example, user interface logic 510 may include a graphical user interface (GUI) that allows a user to input information requesting or accepting a particular time slot for network access and use. In addition, the GUI of user interface logic 510 may allow a user to input information responding to an offer for data usage, as described in detail below.

Communication logic 520 may include logic for communicating with other devices in environment 100. For example, communication logic 520 may transmit and/or receive information from NSS 120 and service provider 130 via network 150. As an example, communication logic 520 may allow user device 110 to request use of an available time slot for a data streaming session. As another example, communication logic 520 may allow user device 110 to receive offers from NSS 120 and/or service provider 130 regarding use of excess network capacity.

Display logic 530 may include logic to display information received from, for example, NSS 120 and service provider 130. In one exemplary implementation, display logic 530 may output information to output device 350 of user device 110, such as an LCD or another type of display. As an example, display logic 530 may display a message from NSS 120 or service provider 130 indicating that unlimited data usage is available for a current or future time period. In some implementations, display logic 530 may also display how much time is remaining in a current unlimited data usage session, as described in more detail below.

Figure 6:
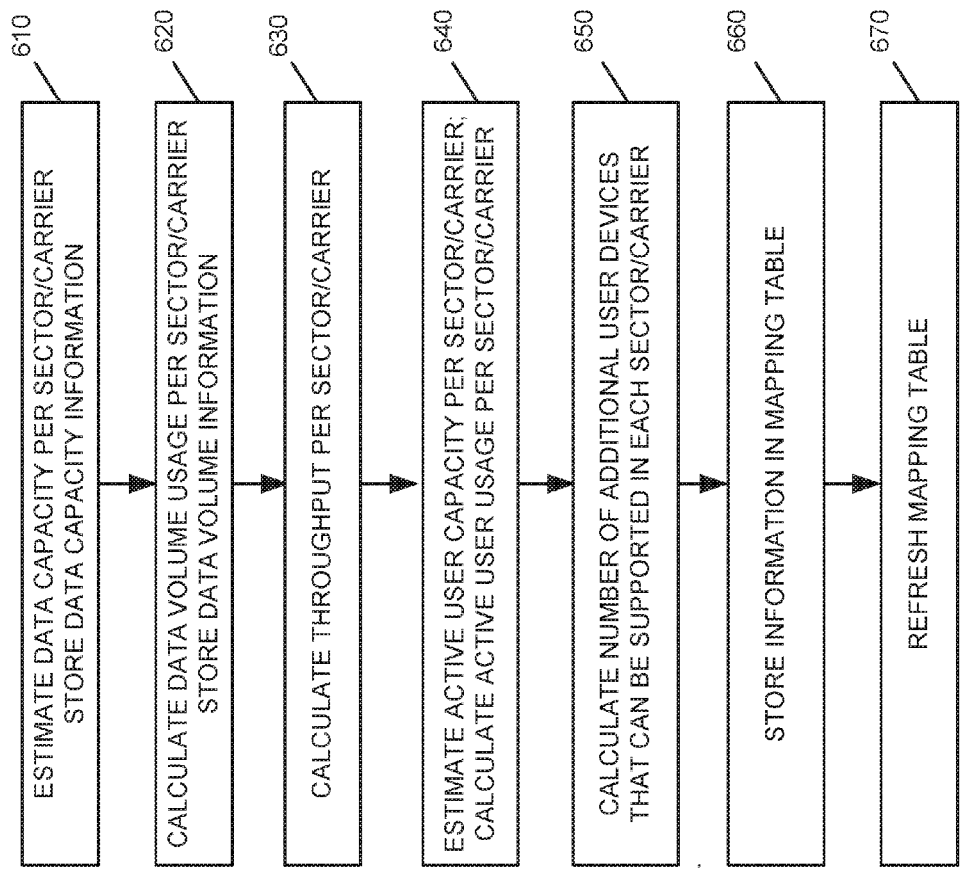
FIG. 6 is a flow diagram illustrating processing by various components illustrated in FIG. 1 in accordance with an exemplary implementation.

FIG. 6 is a flow diagram illustrating exemplary processing associated with determining available excess capacity in a wireless network, such as network 150. Processing may begin with NSS 120 estimating data volume (DV) capacity for sectors in network 150 (block 610). For example, data capacity logic 420 may determine the capacity of each sector in network 150 in megabytes per hour (MB/hour), megabits per second (Mb/s) or some other value. In some implementations, as described above, some of the eNodeBs 220 in network 150 may include multiple RF carriers per sector. In such implementations, data capacity logic 420 may determine the capacity for each carrier in each sector (referred to herein as a sector carrier). In addition, when estimating DV capacity in network 150, data capacity logic 420 may take into consideration underlying metrics associated with network 150, such as cell bandwidth, spectral efficiency, data propagation characteristics, etc. Data capacity logic 420 may store this information in database 430 (block 610).

NSS 120 may also estimate DV usage for each sector (block 620). For example, network monitoring logic 410 may estimate DV usage based on the actual usage of each sector and/or sector carrier in each sector over a predetermined number of time periods. In one implementation, network monitoring logic 410 may calculate DV usage as a percentage (e.g., 85%) of the actual usage on each sector carrier over the last N number of days in 15 minute time aggregation intervals, wherein N is any integer number (e.g., 1 day, 5 days, 7 days, etc.). It should also be understood that other time intervals may be used (e.g., 30 minute intervals, 60 minute intervals, etc.). In each case, network monitoring logic 410 estimates DV usage to capture local demand profile information for relatively short time intervals. Different systems may use different values for the aggregation intervals. Network monitoring logic 410 may store this information in database 430 (block 620).

NSS 120 may also calculate data throughput (TP) for each sector (block 630). For example, network monitoring logic 410 may calculate data TP for each sector carrier in each sector over each selected time interval (e.g., 15 minute intervals). Calculating TP accounts for typical cell load that is observed in the particular sector carrier in the particular time interval. In some implementations, target throughput may also be estimated based on usage for different types of data, such as a high definition (HD) video stream. The target TP may be useful when the available capacity on a sector exceeds what is required to support applications, such as HD video streaming.

NSS 120 may further estimate active user (AU) capacity for each sector (block 640). For example, data capacity logic 420 may determine the number of users that can be active for each sector carrier of network 150 during each selected period of time, also referred to herein as transmission time interval (TTI) or time window. When estimating AU capacity in network 150, data capacity logic 420 may take into consideration underlying metrics associated with network 150, such as cell bandwidth, spectral efficiency, data propagation characteristics, etc.

NSS 120 may also calculate an average active user usage (AUUsg) value for each sector (block 640). For example, network monitoring logic 410 may estimate the average active user usage based on a percentage of the actual usage of each sector carrier over the last N days in each T minute time window. In one implementation, network monitoring logic 410 may estimate the average active user usage as about 85% of the actual active user usage for each sector carrier over the last N days in each T minute time window. Estimation of active user usage captures usage profile and demand that is observed in the particular sector carrier in the particular time interval. In alternative implementations, other percentages may be used (e.g., average plus one standard deviation, average plus two standard deviations, etc.).

NSS 120 may then calculate the number of additional user devices that can be supported in each sector in each time window (block 650). For example, the additional number of user devices Z, where Z is an integer value, may correspond to the number of user devices that can access a particular sector/carrier above the number of user devices that are expected to use that sector/carrier in network 150 during a particular period of time. In other words, the number Z may correspond to additional time slots of data usage that are expected to be unused based on historical data usage. In one implementation, time slot management logic 440 may calculate Z using equation 1 below.

$$Z = \mathrm{Max}[0, \mathrm{Floor}(\mathrm{MIN}((\mathrm{DV\ capacity} - \mathrm{DV\ usage})/(C*TP), \mathrm{AU\ capacity} - \mathrm{AU\ usage}))] \quad \text{Equation 1}$$

That is, time slot management logic 440 may calculate a number of users Z that can be supported by each sector carrier as the maximum of zero and a variable "Floor" in equation 1, corresponding to the minimum of the value calculated by subtracting DV usage from DV capacity and dividing the result by a constant "C" multiplied by the throughput (TP), and the value calculated by subtracting AU usage from AU capacity. In one implementation, the constant C in equation 1 is a value associated with converting Megabits per second into Megabytes per hours and is equal to the value 450. For example, C in equation 1 (which is multiplied by TP in the denominator of the first value from which the minimum value (i.e., NIN) is selected) may correspond to converting Megabits/second into Megabytes/hour and in one implementation is equal to 3600 seconds/hour divided by 8 bits/byte, which is equal to 450. Time slot management logic 440 may then take the maximum of zero and the minimum of the two values calculated for the variable "Floor" in equation 1. Time slot management logic 440 may repeat this calculation for each sector carrier for each period of time. NSS 120 uses the calculated Z values to populate a mapping table that identifies the number of slots for each interval of time that are available for use in each sector (block 660).

FIG. 7 illustrates mapping table 700, which includes eNodeB field 710, sector field 720, carrier field 730 and time window field 740. Mapping table 700 may be stored in database 430. eNodeB field 710 identifies various eNodeBs 220 in network 150. Sector field 720 identifies various sectors served by the corresponding eNodeBs 220. Each eNodeB 220 may service more than one sector (e.g., three or more sectors) in network 150, as illustrated in FIG. 7. For example eNodeB 210001 services the sectors, designated as sectors 1, 2 and 3. Carrier field 730 identifies a particular RF carrier associated with an eNodeB 220. For example, as described above, each eNodeB 220 may include multiple radios that operate at different frequencies or different frequency bands within the same sector. For example, eNodeB 210002 in sector 1 includes two sector carriers, designated as carriers 1 and 2.

Time window field 740 (also referred to herein as time slots field 740) includes a number of 15 minute intervals of time throughout the day (a portion of which are illustrated in table 700). The values in the entries in time window field 740 correspond to the Z values calculated in accordance with Equation 1 above, and identify the number of available time slots which are expected to be unused and available for customers' use within each time window 740. For example, in entry 702-1, which corresponds to eNodeB 210001, sector 1, carrier 1, there is one time window available for the time period 1:00-1:15, three time windows available for the time period 1:15-1:30, five time windows available for the time period 1:30-1:45, etc., as indicated in time window field 740 for entry 702-1. Time slots granted to user devices 110 may encompass multiple consecutive time windows, subject to availability in successive time windows.

Service provider 130 may make the identified time slots available to customers. For example, in one implementation, customers may request time slots via wireless data program 500. In some instances, a user may request a time slot and NSS 120 may process the request on a first come, first served basis. In other instances, NSS 120 and/or service provider 130 may advertise the availability of the time slots to customers based on the customers' historic usage patterns and/or geographic locations. For example, NSS 120 and/or service provider 130 may access historic data usage indicating that a particular customer uses large amounts of data at a particular location and/or at a particular time of day (e.g., at home between 8:00 PM and 9:00 PM). In this case, NSS 120 may send an offer to user device 110 associated with that particular customer indicating that unlimited data usage is available for that period of time at that particular customer's geographic location.

As described above, in some implementations, data usage during the time slots illustrated in mapping table 700 may correspond to an unlimited amount of data usage during that period of time. In addition, service provider 130 may not count or track usage corresponding to the requested time slots against the customers' data plan limits. For example, in one implementation, if a customer associated with user device 110-1 requests a time slot serviced by eNodeB, sector 1 at 1:15-1:30 and NSS 120 grants the request, service provider 130 will not count data usage during this time slot against the customer's monthly allotment. In some instances, service provider 130 may make an offer to the customer for the unlimited data usage during the time slot. In some instances, service provider 130 may charge the customer a relatively low fee for the unlimited data usage during the requested time slot (e.g., $1 or less for a one hour data session). In another instance, service provider 130 may offer the customer an option to view or evaluate certain content in exchange for the unlimited data usage during the requested time slot. This allows service provider 130 to more fully and efficiently utilize network capacity. As a result, overall network utilization increases. In addition, having a more fully loaded or utilized network allows service provider 130 to more accurately determine full network capacity under actual conditions, as opposed to a theoretical maximum capacity. In addition, monitoring network 150 under fully or nearly fully loaded conditions may allow service provider 130 to identify locations where additional network resources (e.g., eNodeBs, gateways, routers, etc.,) are needed to ensure or increase network availability and reliability.

NSS 120 may refresh mapping table at predetermined periods of time (block 670). For example, NSS 120 may update mapping table daily, weekly, monthly, etc. In each case, mapping table 700 stores information identifying time periods in which excess network capacity is expected to exist. In addition, mapping table 700 may be regenerated to account for updated historical usage information. However, the refreshing or updating of mapping table 700 may exclude traffic volume changes associated with usage attributed to excess capacity in the time slots associated with mapping table 700 during the previous period of time.

Figure 8:
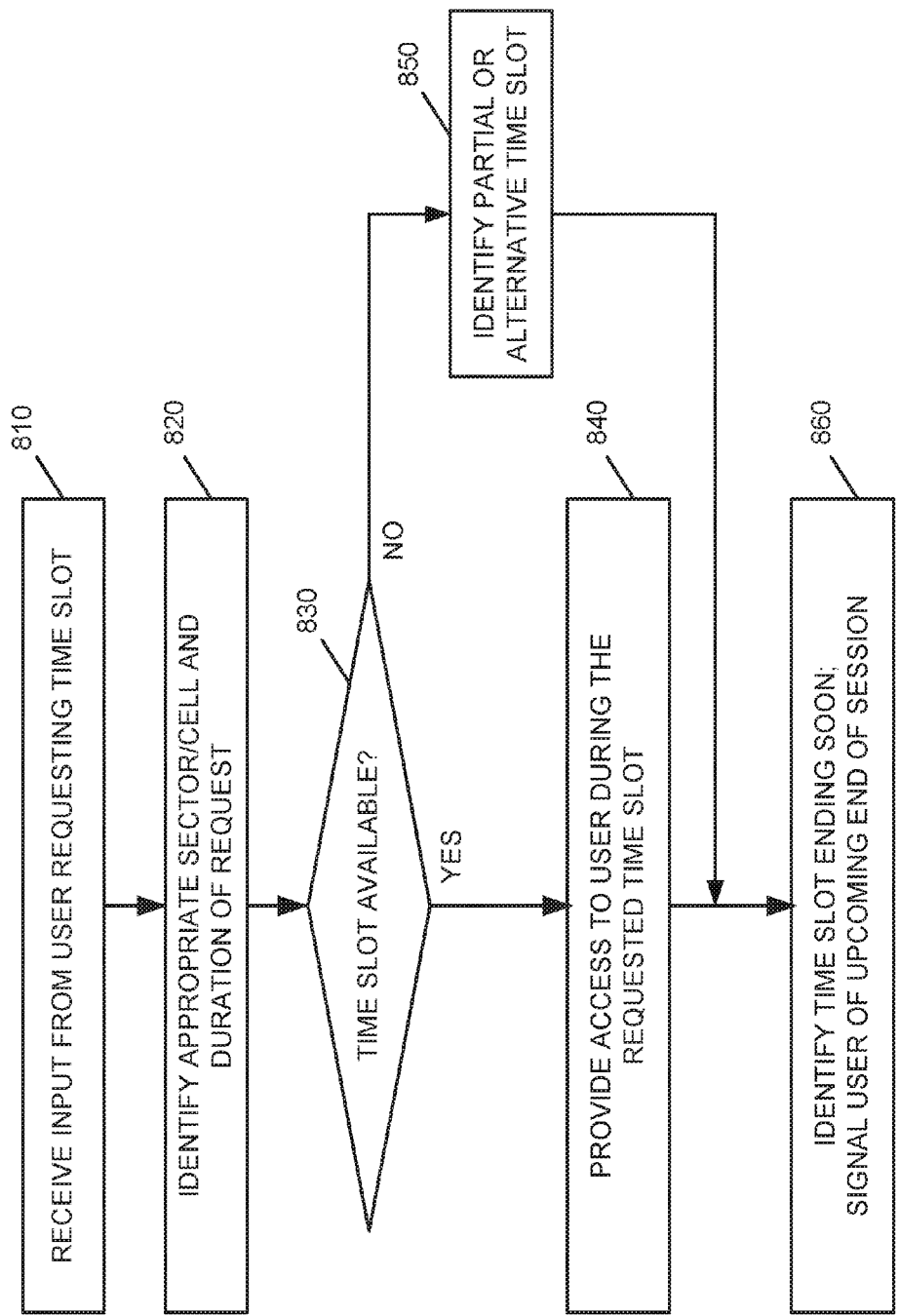
FIG. 8 is a flow diagram associated with requesting data services in accordance with an exemplary implementation.

FIG. 8 is a flow diagram illustrating processing associated with requesting time slots in network 150. Processing may begin with a user associated with user device 110 launching or accessing wireless data program 500. The user of user device 110 may then provide input requesting a time slot of a certain duration beginning at a certain time (block 810). For example, the user, via a GUI provided by user interface logic 510, may request a particular time slot for streaming data (e.g., watch a live sporting event, download a movie, listen to music, etc.). Communication logic 520 may forward the request to NSS 120. The request from user device 110 may include a cell ID identifying the cell to which user device 110 is currently connected. The request from user device 110 may also include the duration of the request (e.g., 30 minutes, 40 minutes, etc.). In alternative implementations, after wireless data program 500 is launched, communication logic 520 may signal NSS 120 requesting information identifying available time slots for accessing network 150. In response, communication logic 450 of NSS 120 may forward information to user device 110 indicating the available time slots.

Assume that user device 110 has transmitted a request for a time slot of a certain duration to NSS 120. NSS 120 receives the request and may store the request in a first in, first out (FIFO) queue for incoming requests. NSS 120 may pull each request from the FIFO queue in sequence and process the request. NSS 120 may identify cell information from the request, such as the cell/sector identifier (ID) and a sector carrier on which the request was received, and also identify the duration of the request (block 820). NSS 120 then queries table 700 using the sector ID, sector carrier and the duration of the request to determine if the requested time slot duration is available (block 830). That is, NSS 120 compares the requested duration to the maximum consecutive 15 minutes slots that are available in the particular sector and carrier. If an adequate number of time slots in the appropriate sector with the appropriate carrier are available to fulfill the request, NSS 120 provisions the time slot to user device 110 (block 840).

For example, assume that a user device 110 attached to eNodeB 210002, sector 1 and communicating via sector carrier 2, requests a 45 minutes time slot at 1:05. Referring to table 700, time window field 740 for time period 1:30-1:45 in entry 702-5 indicates that zero time slots are available from 1:30-1:45 (i.e., no time slot is available). In some implementations, NSS 120 may grant user device 110 a partial time slot, such as a time slot from only 1:05-1:30, since no time slots are available from 1:30-1:45 (block 850). In other implementations, if the full time period is not available (block 830—no), time slot management logic 440 may identify an alternative time slot in which the full time period is available (block 850). For example, time slot management logic 440 may identify time slots from 1:45 through 2:30 as being available since each of those time periods has values greater than zero. Time slot management logic 440 may offer those time slots to the user. In other implementations, NSS 120 may signal user device 110 that the requested time slot is not available.

Assume that the time slot, a partial time slot or an alternative time slot was granted to user device 110. NSS 120 may send user device 110 a message indicating that the time slot has been granted for unlimited data usage during the granted time slot. User device 110 may receive the message from NSS 120 and display logic 530 of wireless data program 500 may output the message. For example, referring to FIG. 9A, user device 110, corresponding to a smart phone device in this example, may display message 910 via an output screen of user device 110. The message may indicate "unlimited data session available for 25 minutes," as illustrated in FIG. 9A. In this scenario, after provisioning the 1:05-1:30 time slot, NSS 120 subtracts one time slot from each of the entries for the 1:00-1:15 time window and the 1:15-1:30 time window in entry 702-5 shown in mapping table 700 to ensure that mapping table 700 includes an accurate count of available time slots.

As another example, assume that a user attached to eNodeB 210055, sector 3 via carrier 1 requests a 30 minute time slot at 1:30. NSS 120 checks table 700 and determines that time slots in entry 702-12 (corresponding to eNodeB 210055, sector 3, carrier 1) are available from 1:30 through 2:30. In this case, NSS 120 may offer additional time slots beyond the requested 30 minute time slot at an incremental cost. For example, NSS 120 may provision the 30 minute time slot from 1:30-2:00 and offer the user the time slot between 2:00 and 2:30 for an additional small fee or in exchange for the customer agreeing to receive content from service provider 130. In either case, when NSS 120 provisions the 30 minute time slot, time slot management logic 440 subtracts one from each appropriate time slot (i.e., time slot 1:30-1:45 and 1:45-2:00) in entry 702-12. If, however, the user chooses the additional 30 minute time slot (i.e., from 2:00-2:30), time slot management logic 440 subtracts one from each additional time slot (i.e., 2:00-2:15 and 2:15-2:30) in entry 702-12.

Figure 9B:
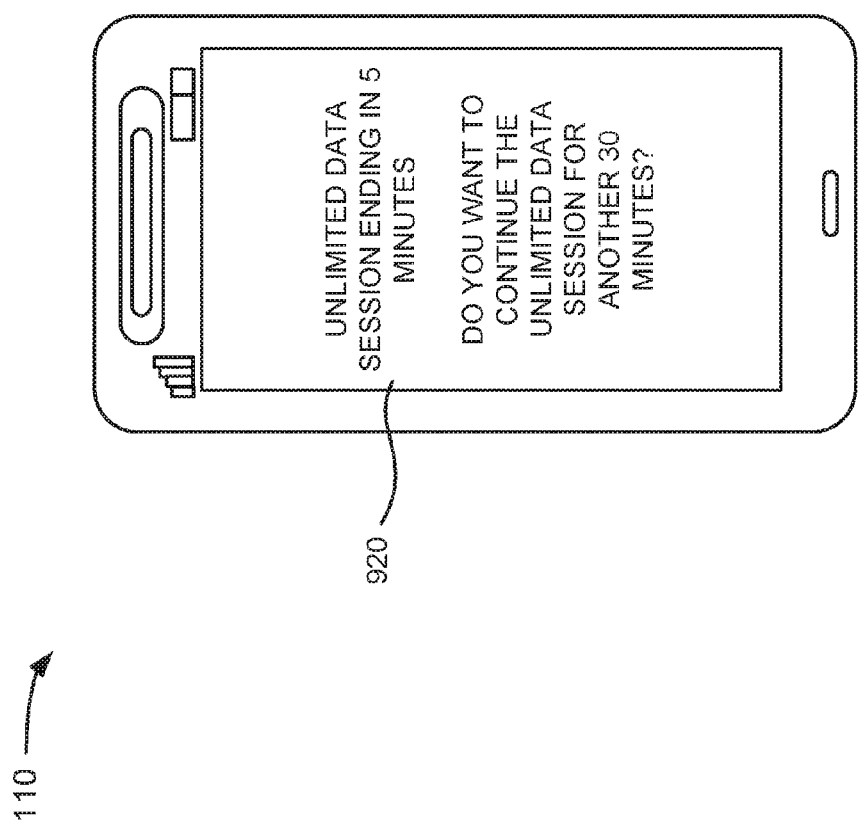

In some implementations, NSS 120 may identify that a time slot associated with a granted user session is coming to an end (block 860). In this case, NSS 120 may send a message to user device 110 indicating that a current session is coming to an end (block 860). For example, in some instances NSS 120 may send a message to user device 110 a short period of time (e.g., 5 minutes) prior to the ending of a data session. User device 110 may receive the message and output the message to the user, as illustrated in FIG. 9B. Referring to FIG. 9B, user device 110 may display message 920 indicating that "unlimited data session is ending in 5 minutes," and query whether the user would like to continue the unlimited data session. For example, the message may be "do you want to continue the unlimited data session for another 30 minutes?" In this manner, NSS 120 may provide the user with additional opportunities to access unlimited data usage via network 150.

As described above, NSS 120 may provision requests from user devices 110 on a first come, first served in basis. In other implementations, NSS 120 may account for user mobility in granting slots. For example, in some implementations, NSS 120 may check mapping table 700 for the availability of time slots in the sector to which a user device is currently attached and to sectors within a predetermined radius (e.g., 5 miles, 10 miles, 30 miles, etc.) of the user's current sector. That is, NSS 120 may check mapping table for available time slots within a distance or radius of the current sector in case the user moves to a new location outside the original sector. In this case, NSS 120 checks for availability in geographically adjacent sectors within the predetermined distance or radius. In some implementations, NSS 120 may make sure that time slots are available in the geographically adjacent sectors prior to determining whether to grant a customer's request for an unlimited data session.

In some implementations, NSS 120 may also check whether time slots associated with particular carrier frequencies are available in neighboring sectors prior to granting a time slot. This also accounts for user mobility over time. Still further, in some implementations, features such as carrier aggregation may be disabled when accessing available time slots. For example, carrier aggregation may aggregate multiple bands on a user device 110 simultaneously, such that a user device 110 can use, for example, a 700 Megahertz (MHz) band and another advanced wireless services (AWS) band simultaneously for downloads. In this case, granting time slots to such a user device 110 may have more impact on network 150 than if carrier aggregation is not used. To mitigate such impact, carrier aggregation may be turned off/disabled when accessing time slots identified in mapping table 700. In another alternative implementation, if a device is known to be carrier aggregation capable, then the number of slots for both carriers can be reduced by one when a request/session is granted.

In addition, in some implementations, NSS 120 and/or service provider 130 may account for time and/or location restrictions in allotting time slots via mapping table 700. For example, NSS 120 may exclude certain areas in a city (e.g., a busy downtown business district) during working hours (e.g., 9:00 AM to 5:00 PM), or a sports stadium during a sporting event from mapping table 700. That is, time slot management logic 440 may reduce the number of available time slots (e.g., to a small number or zero) in an area that is expected to be crowded with user devices 110 that are expected to fully load network 150 during those time periods. Advance information from various systems, such as sports/concert ticketing systems, provided through application programming interfaces (APIs) may be used to determine the expected number of users at a particular location during a period of time.

As described above, time slot management logic 440 may process requests from user devices 110 on a first come, first served basis. In other implementations, NSS 120 may grant time slots to user devices that would cause less impact on overall processing throughput. For example, NSS 120 may make radio frequency (RF) power measurements, such as received signal received power (RSRP) measurements, to determine an approximate location of user device 110 based on the RSRP associated with a request. In this case, time slot management logic 440 may favor a user device 110 that has a greater RSRP value, indicating that the user is closer to the center of the sector. As a result, such a user is expected to have less impact on spectrum resources per megabyte volume than a user located on an edge portion or outer area of a sector. In this implementation, NSS 120 gives preferences to user device 110 that has less impact on overall network efficiency.

In addition, in some implementations, network 150 may support multiple scheduler classes of service. That is, traffic can be assigned to different quality of service (QoS) classes. In this case, NSS 120 may favor classes of service that will have less impact on network 150, thereby mitigating impact on other types of expected traffic.

Implementations described herein provide for estimating unused capacity on a network. The unused capacity may then be offered to customers during relatively short intervals of time. In some instances, the unused capacity may be offered as unlimited data usage over the granted periods of time and the amount of data usage during these time periods will not count against a customer's monthly data plan allotment. In some instances, the "extra" data usage will be charged to the customer at a relatively low rate, as compared to the customer's charges for data usage via the customer's regular data plan. In other instances, the extra data may be provided in exchange for the user agreeing to receive, view and/or rank content provided by the service provider or another third party.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to estimating a capacity metric and a usage metric to identify the number of available time slots. In other implementations, other metrics that account for the number of connections on an eNodeB, the physical resource block utilization (PRBU) or the transmission time interval utilization (TTIU) may be used to identify available unused capacity. In each case, historical data usage and estimated capacity may be used to estimate unused capacity for future periods of time. The unused capacity may then be offered to customers, resulting in a more fully loaded network. In addition, offering unused to capacity to customers for unlimited usage during various periods of time may increase the utilization of network 150 during traditionally off-peak hours. This off-peak usage may result in a less congested network during typical peak times, thereby resulting in increased data throughput on network 150 and increased customer satisfaction.

In addition, implementations described above refer to estimating data capacity associated with eNodeBs that support multiple sectors and multiple sector carriers. It should be understood that implementations described herein can be used with a network in which eNodeBs or cell sites support one sector and/or one carrier. Still further, implementations have been described herein as measuring data capacity and usage on a sector carrier level granularity. In other implementations, data capacity and usage could be measured/estimated on a higher or lower granularity (e.g., a sector level, a sub-carrier level, etc.).

Further, while series of acts have been described with respect to FIGS. 6 and 8, the order of the acts may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method, comprising:
   determining at least one capacity metric for each carrier associated with each of a plurality of sectors in a wireless network;
   estimating at least one usage metric for each carrier associated with each of the plurality of sectors for each of a plurality of periods of time;
   determining a number of user devices that can access data services via each of the carriers in each of the plurality of sectors for each of the plurality of periods of time based on the at least one capacity metric and the at least one usage metric;
   storing information identifying the determined number of user devices for each of the carriers for each of the plurality of sectors for each of the plurality of periods of time;
   receiving a request from a first user device for access to data services during a first one of the plurality of periods of time, wherein the first user device is associated with a first carrier and a first sector;

accessing the stored information to determine whether the number of user devices that can access data services via the first carrier in the first sector for the first period of time is greater than zero; and providing access to data services via the wireless network to the first user device during the first period of time, in response to determining that the number of user devices that can access data services via the first carrier in the first sector for the first period of time is greater than zero.

2. The computer-implemented method of claim 1, wherein the at least one capacity metric comprises data capacity, and wherein the at least one usage metric comprises an estimated data usage.

3. The computer-implemented method of claim 2, wherein the determining the number of user devices comprises:

subtracting the estimated data usage from the data capacity and dividing a result by a throughput value associated with each carrier.

4. The computer-implemented method of claim 1, wherein the at least one capacity metric comprises an active user capacity value identifying a maximum number of user devices that can simultaneously access data services, and wherein the at least one usage metric comprises an active user usage value identifying an estimated number of active user devices that are expected to simultaneously access data services.

5. The computer-implemented method of claim 4, wherein the determining the number of user devices comprises:

subtracting the active user usage value from the active user capacity value.

6. The computer-implemented method of claim 1, wherein storing the information comprises storing the information in a mapping table, the method further comprising:

updating the mapping table at predetermined times based on actual usage information for the wireless network; and decrementing, in the mapping table, the number of user devices for the first carrier in the first sector for a time window corresponding to the first period of time by one in response to providing access to data services to the first user device during the first period of time.

7. The computer-implemented method of claim 1, wherein the first user device is associated with a first customer having a data plan, the method further comprising:

excluding data usage by the first user device during the first period of time from being applied against a data limit associated with the first customer's data plan.

8. The computer-implemented method of claim 1, further comprising:

receiving a second request from a second user device for access to data services during a second period of time, wherein the second user device is associated with a second carrier in a second sector of the wireless network;

accessing the stored information to determine whether the number of user devices that can access data services via the second carrier in each of the second sector and at least one sector that is located geographically adjacent to the second sector is greater than zero; and providing access to data services to the second user device during the second period of time in response to determining that the number of user devices that can access data services via the second carrier in each of the second sector and the at least one geographically adjacent sector for the second period of time is greater than zero.

9. The computer-implemented method of claim 1, further comprising:

receiving a second request from a second user device and a third request from a third user device for access to data services during a second period of time, wherein each of the second user device and the third user device are associated with a second sector in the wireless network; and favoring one of the first user device or second user device with respect to granting either the second request or the third request based on at least one of power measurements associated with signals received via the first user device and second user device or class of service associated with the second request and the third request.

10. The computer-implemented method of claim 1, wherein the storing information comprises storing information in a mapping table, wherein the mapping table identifies the number of user devices in each of the plurality of sectors for each of the plurality of periods of time that are expected to be available for use based on historical data usage information.

11. The computer-implemented method of claim 1, further comprising:

identifying data usage patterns associated with a second user device, wherein the second user device is associated with a customer of a service provider associated with the wireless network;

sending, to the second user device and based on the identified data usage patterns, an offer for unlimited data usage via the wireless network during a second one of the periods of time;

receiving, from the second user device, an acceptance of the offer; and excluding data usage by the second user device during the second period of time from being applied against a data limit associated with a data plan of the customer.

12. A system, comprising:
a memory; and
at least one device configured to:

determine at least one capacity metric for each of a plurality of sectors in a wireless network, estimate at least one usage metric associated with each of the plurality of sectors for each of a plurality of periods of time, determine a number of user devices that can access data services for each of the plurality of periods of time based on the at least one capacity metric and the at least one usage metric, store information identifying the determined number of user devices for each of the plurality of sectors for each of the plurality of periods of time, receive a request from a first user device for access to data services during a first one of the plurality of periods of time, wherein the first user device is associated with a first sector, access the stored information to determine whether the number of user devices that can access data services in the first sector for the first period of time is greater than zero, and provide access to data services via the wireless network to the first user device during the first period of time, in response to determining that the number of user devices that can access data services in the first sector for the first period of time is greater than zero.

13. The system of claim 12, wherein the at least one capacity metric comprises data capacity, and wherein the at least one usage metric comprises an estimated data usage, and
when determining a number of user devices, the at least one device is configured to:
subtract the estimated data usage for each sector from the data capacity for the corresponding sector and divide a result by a throughput value associated with the corresponding sector.

14. The system of claim 12, wherein the at least one capacity metric comprises an active user capacity value identifying a maximum number of user devices that can simultaneously access data services, and wherein the at least one usage metric comprises an active user usage value identifying an estimated number of active user devices that are expected to simultaneously access data services, and
when determining the number of user devices, the at least one device is configured to:
subtract the active user usage value from the active user capacity value.

15. The system of claim 12, wherein when storing information, the at least one device is configured to:
store information in a mapping table, the mapping table identifying the number of user devices for each of the plurality of periods of time that are expected to be unused.

16. The system of claim 12, wherein the first user device is associated with a first customer having a data plan, and wherein the at least one device is further configured to:
exclude data usage by the first user device during the first period of time from being applied against a data limit associated with the first customer's data plan.

17. The system of claim 12, wherein the at least one device is configured to:
identify data usage patterns associated with a second user device, wherein the second user device is associated with a customer of a service provider associated with the wireless network; and
send, to the second user device and based on the identified data usage patterns, an offer for unlimited data usage via the wireless network during a second one of the periods of time.

18. A non-transitory computer-readable medium having stored thereon sequences of instructions which, when executed by at least one processor, cause the at least one processor to:
determine at least one capacity metric for each of a plurality of sectors in a wireless network;
estimate at least one usage metric associated with each of the plurality of sectors for each of a plurality of periods of time;
determine a number of user devices that can access data services for each of the plurality of periods of time based on the at least one capacity metric and the at least one usage metric;
store information identifying the determined number of user devices for each of the plurality of sectors for each of the plurality of periods of time;
receive a request from a first user device for access to data services during a first one of the plurality of periods of time, wherein the first user device is associated with a first sector;
access the stored information to determine whether the number of user devices that can access data services in the first sector for the first period of time is greater than zero; and
provide access to data services via the wireless network to the first user device during the first period of time, in response to determining that the number of user devices that can access data services in the first sector for the first period of time is greater than zero.

19. The non-transitory computer-readable medium of claim 18, wherein the first user device is associated with a first customer having a data plan, and wherein the instructions further cause the at least one processor to
exclude data usage by the first user device during the first period of time from being applied against a data limit associated with the first customer's data plan.

20. The non-transitory computer-readable medium of 18, wherein the instructions further cause the at least one processor to:
identify data usage patterns associated with a second user device, wherein the second user device is associated with a customer of a service provider associated with the wireless network; and
send, to the second user device and based on the identified data usage patterns, an offer for unlimited data usage via the wireless network during a second one of the periods of time.

* * * * *